US006307348B1

United States Patent
Green

(10) Patent No.: US 6,307,348 B1
(45) Date of Patent: Oct. 23, 2001

(54) MOUNTING STANDS FOR USE WITH AC ADAPTERS

(75) Inventor: Donald R. Green, San Marcos, CA (US)

(73) Assignee: Denso Corporation (JP)

(*) Notice: Subject to any disclaimer, the term of this patent is extended or adjusted under 35 U.S.C. 154(b) by 0 days.

(21) Appl. No.: 09/527,072

(22) Filed: Mar. 16, 2000

(51) Int. Cl.⁷ ........................................... H02J 7/02
(52) U.S. Cl. ..................... 320/111; 320/113; 455/462; 455/573
(58) Field of Search ................... 320/111, 113, 320/119; 455/573, 462; 710/101

(56) References Cited

U.S. PATENT DOCUMENTS

| | | | | |
|---|---|---|---|---|
| 5,801,513 | * | 9/1998 | Smith et al. ........................ | 320/113 |
| 5,847,541 | * | 12/1998 | Hahn .................................. | 320/111 |
| 5,867,798 | * | 2/1999 | Inukai et al. ....................... | 455/573 |
| 5,907,197 | * | 5/1999 | Faulk ................................. | 307/119 |
| 6,029,215 | * | 2/2000 | Watts, Jr. et al. ................. | 710/101 |
| 6,167,278 | * | 12/2000 | Nilssen .............................. | 455/462 |

* cited by examiner

Primary Examiner—Peter S. Wong
Assistant Examiner—Pia Tibbits
(74) Attorney, Agent, or Firm—Fish & Richardson P.C.

(57) ABSTRACT

A mounting stand is provided for use with an AC adapter that includes a plug, a cord and a connector. The mounting stand includes a housing constructed to allow a device connected to the AC adaptor to be maintained in a desired position. The housing includes a solid inner portion, a first outer surface that is substantially planar and is constructed to allow the stand to be placed on a flat surface, a second outer surface having a recess constructed to receive the device, and a bore extending through the solid inner portion and terminating in a well in the recess, the well being constructed to receive the connector. The bore is constructed to receive a portion of the cord and the first opening being constructed to allow the connector to at least partially extend into the recess.

17 Claims, 3 Drawing Sheets

MOUNTING STANDS FOR USE WITH AC ADAPTERS

BACKGROUND OF THE INVENTION

The invention relates to mounting stands for use with AC adapters, such as stands for mounting a device containing a rechargeable battery while the battery is being recharged by an AC adapter.

For many years, electrically-powered devices, and in particular devices that include a rechargeable battery, have been provided with detachable AC adapters. Typically, such adapters include a cord having a plug at one end to connect the adapter to a power source, and a connector at the opposite end to connect the adapter to the device, via a power jack on the device.

Small electronic devices that require frequent recharging, such as wireless telephones, have also been sold with a separate "desk-top stand" that allows the device to be mounted in an upright, stable position during recharging. These stands typically include a housing for holding the device in the desired position, a first connector for connecting the housing to the power jack of the device, a second connector for connecting the housing to the connector of an AC adapter, and a connection between the first and second connectors.

SUMMARY OF THE INVENTION

The invention features a mounting stand for an electrically-powered device that provides the convenience of a desk-top stand at a low cost. The stand of the invention preferably does not include any electronic components or connectors, and thus is both simple and inexpensive to manufacture, reliable, and virtually unbreakable under normal use conditions.

In one aspect, the invention features a mounting stand for use with an AC adapter that includes a plug, a cord and a connector. The mounting stand includes a housing constructed to allow a device connected to the AC adaptor to be maintained in a desired position. The housing includes a solid inner portion, a first outer surface that is substantially planar and defines a base that allows the stand to rest on a flat surface, a second outer surface having a recess constructed to receive the device, and a bore extending through the solid inner portion and terminating in a well, positioned in the recess, that is constructed to receive the connector. The bore is constructed to receive a portion of the cord and the well is constructed to allow the proximal end of the connector to extend into the recess.

Preferred implementations of the invention include one or more of the following features. The housing includes an opening, communicating with the bore, in a third outer surface of the housing that is disposed adjacent the first outer surface and at an angle thereto, to prevent the cord from being caught under the housing when the stand is in use. The housing comprises two interlocking pieces that are detachable so that a user of the stand can separate the two pieces to insert or remove the cord. Each piece includes a portion of the solid inner portion and a portion of the recess. Each piece also preferably includes a portion of the first outer surface. The bore is defined by a channel disposed in the solid inner portion of one of the pieces and a flat surface of the solid inner portion of the other piece. Alternatively, the bore is defined by opposed channels in the solid inner portions of the two pieces. The well is defined by a pair of opposed channels, one in the solid inner portion of one of the pieces and the other in the solid inner portion of the other piece. The two pieces are held together by interference engagement of a pair of arms extending beyond side edges of one piece with a pair of corresponding openings on opposed side edges of the other piece. Each of the arms includes a push-tab that is dimensioned for insertion into a respective opening, and the two pieces are disengaged by pressing the push-tabs to cause the arms to resiliently deflect, releasing the push-tabs from the openings. The well is positioned to correspond to the position of the power jack of the device when the device is mounted in the stand. The recess is substantially cup-shaped, or is partially cup-shaped and open on one side. The recess is constructed to receive a device selected from the group consisting of wireless phones, e.g., cellular phones or PCS telephones, or personal digital assistants. The device includes a rechargeable battery and the AC adaptor is used to recharge the battery when the device is mounted in the stand.

The term "cup-shaped recess", as used herein, means a cavity that is open at its top, and includes side walls constructed to at least partially surround an object placed in the cavity. The cavity may have any desired cross-sectional shape, e.g., rectangular, circular, oval or C-shaped.

Other features and advantages of the invention will be apparent from the following description of a presently preferred embodiment, and from the claims.

DESCRIPTION OF THE PREFERRED EMBODIMENTS

Figure 1A:
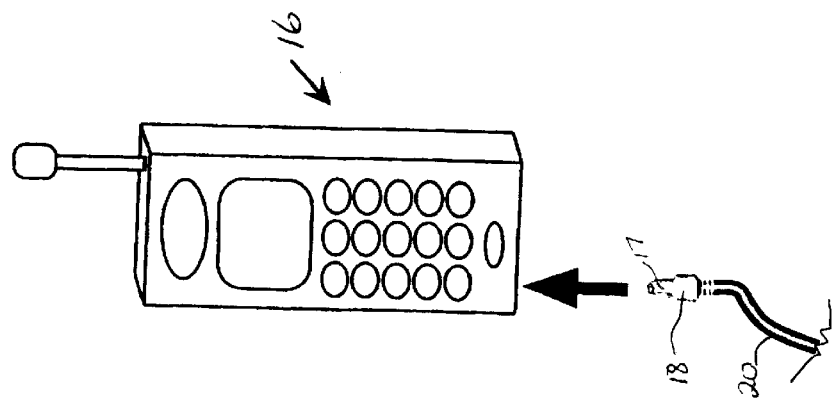
FIG. 1A is a diagrammatic perspective view of the AC adapter shown in FIG. 1 after removal from the mounting stand, for use separately with the wireless phone.
Figure 1:
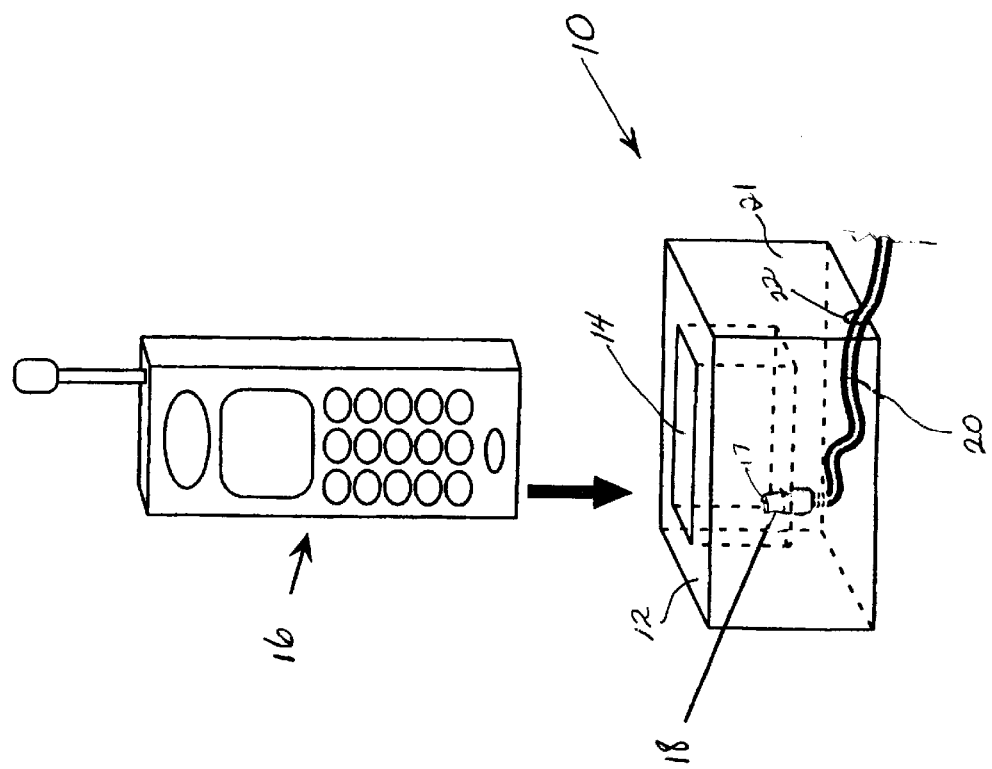
FIG. 1 is a diagrammatic perspective view of a mounting stand according to one embodiment of the invention, shown with a wireless phone to be used with the stand.

FIG. 1 shows a mounting stand 10 including a housing 12 having a recess 14 that is dimensioned to receive an electrically-powered device such as a wireless telephone 16. As will be explained in further detail below, the housing is also constructed to receive the connector 18 and a portion of the cord 20 of an AC adaptor. The proximal end 17 of connector 18 extends into recess 14, to allow it to be inserted into the power jack (not shown) of telephone 16. The cord runs into the housing 12 through an opening 22 that is positioned on a side surface 21 of the housing so that the cord generally will not be caught under the bottom surface of the housing when the stand is resting on a surface, e.g., a desk. If the user wishes to use the AC adaptor alone, without the mounting stand (FIG. 1A), the cord and connector can be removed from mounting stand 10 as will be described below.

Figure 2:
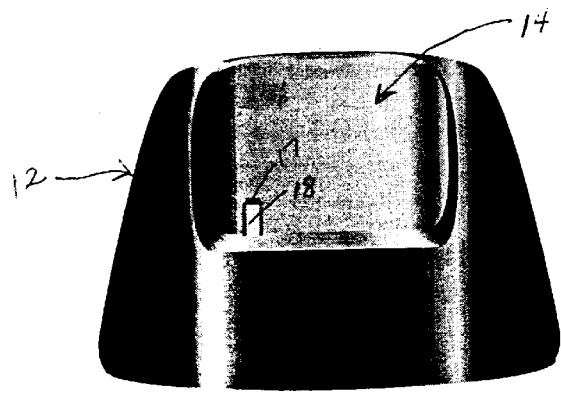
FIGS. 2, 2A and 2B are, respectively, front, rear and side plan views of a mounting stand according to an alternate embodiment of the invention.
Figure 2A:
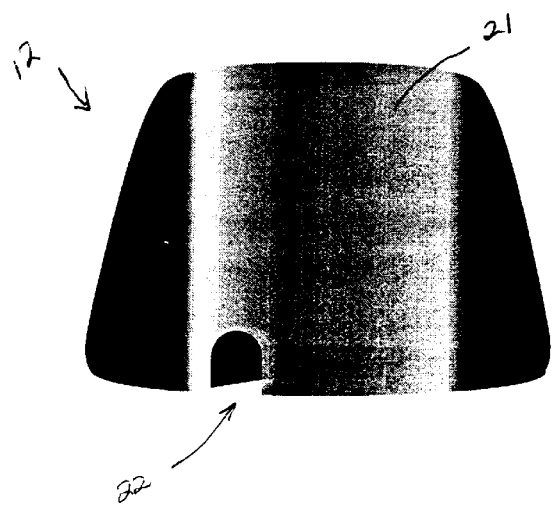
Figure 2B:
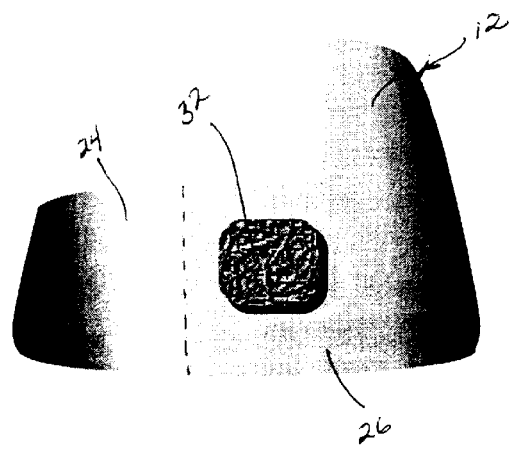

The recess can be any desired shape to accommodate a specific phone. Another recess shape is shown in FIGS. 2 and 2B, in the shape of a partial cup, the front side of which is open.

Figure 3A:
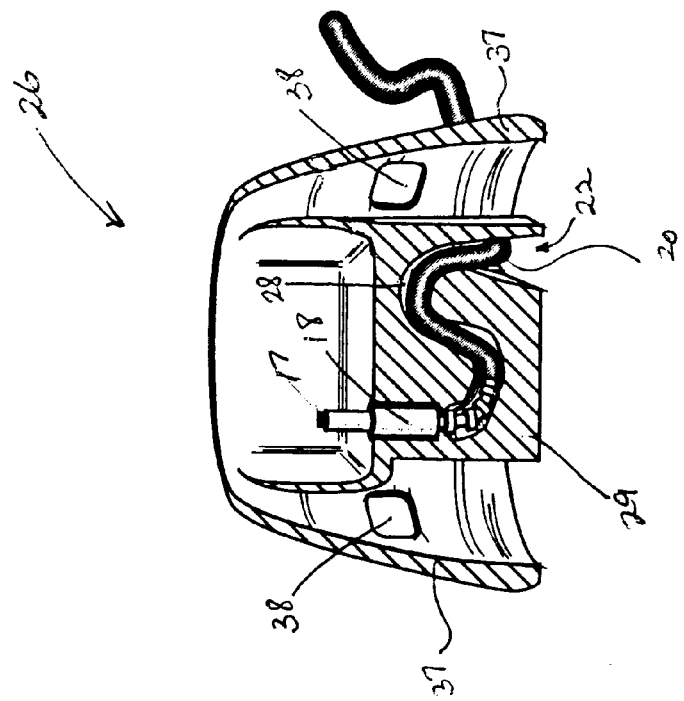
FIGS. 3 and 3A are plan views of the front and back members, respectively, of the mounting stand of FIG. 2. Both views are taken from the inner-facing side of each member.
Figure 3:
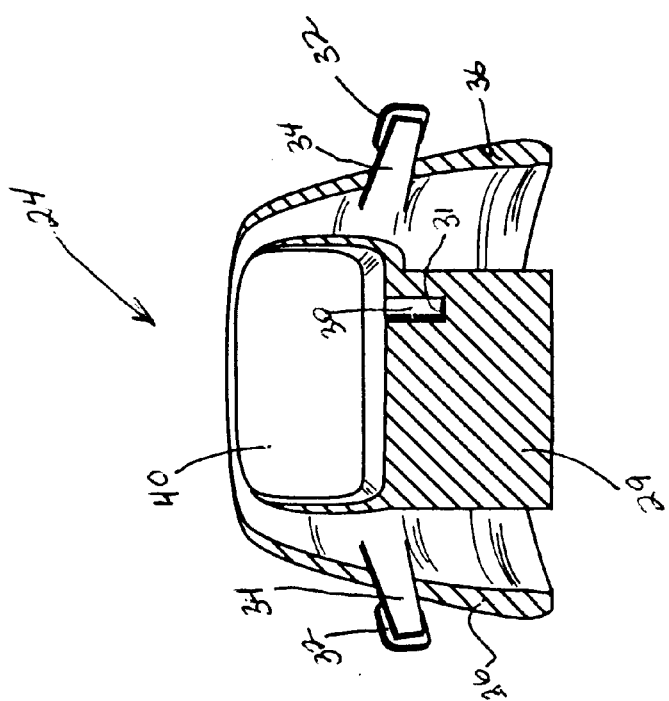

FIGS. 3 and 3A show that the housing 12 is formed by assembling a front member 24 (FIG. 3) to a back member 26

(FIG. 3A). The front and back members together define a bore 28 in solid portion 29 of the housing, through which cord 20 extends, and a well 30 for receiving the connector 18. Well 30 has a floor 31 that is constructed to support the distal end of the connector 18, and thereby keep the connector 18 from slipping down into bore 28 when the telephone 16 is placed in the recess 14. The front and back members also define the recess 14. Thus, the back member 26 includes a back portion of the recess, while the front member 24 includes an open archway 40 that extends the recess forward.

The front member is removably attached to the back member, so that the user can easily separate the front and back members to insert or remove the AC power cord. The front and back members are held together by the interference engagement of push-tabs 32 (FIGS. 2B and 3), mounted on arms 34 that extend outwardly from the inner surface of the front member 24, beyond its side edges 36, with receiving apertures 38 in back member 26. Arms 34 are sufficiently thin and flexible so that they can resiliently deflect when pushed inward, and then spring back to their normal position. Thus, when the stand is assembled and the user wishes to take it apart, the user simply presses in on the push-tabs and pulls the two members apart. Similarly, to assemble the stand, the user simply aligns the side edges 36, 37 of the two members and presses the two members together (the arms 34 will deflect during this procedure without the need for the user to press in on the push-tabs). Preferably, the push-tabs have a textured surface, as shown in FIG. 2B, and are raised slightly above the surface of the housing, to make their function apparent to the user.

Other embodiments are within the claims. For example, the recess may have any desired shape that is suitable for receiving a device to be mounted. Moreover, the housing can be split into two members in a different manner (rather than splitting the housing in half as shown) provided that the two members define the bore for the power cord. Additionally, the two members of the housing can be removably attached in any desired manner, e.g., using other types of interference-fit attachment.

What is claimed is:

1. A mounting stand for use with an AC adapter that includes a plug, a connector, and a cord, said stand comprising:
   a first member; and
   a second member capable of removably interlocking with said first member;
   wherein said first and second member, when interlocked, forms a recess sized to fit a portable device and a substantially cylindrical well adapted to contain said AC adapter connector.

2. The mounting stand of claim 1 wherein said first member comprises at least one arm, said at least one arm comprising a distal end and a push-tab at said distal end, and said second member comprises at least one aperture positioned and sized to receive said push-tab of said first member.

3. The mounting stand of claim 1 further comprising a recessed channel formed when said first and second members are interlocked.

4. The mounting stand of claim 1 wherein said well comprises a flat surface at one end, said flat surface adapted to contact a distal end of said AC adapter connector.

5. The mounting stand of claim 1, wherein said portable device has an AC receptacle and said well of said stand is positioned to correspond to the location of said AC receptacle.

6. The mounting stand of claim 1 wherein said recess is sized to fit a device selected from the group consisting of a wireless telephone, an electronic personal desk accessory and a portable computer.

7. A charging system comprising:
   an AC adapter comprising a plug, a connector and a cord;
   a portable rechargeable device; and
   a mounting stand comprising
      a first member; and
      a second member capable of removably interlocking with said first member;
   wherein said first and second member, when interlocked, forms a recess sized to fit said device and a substantially cylindrical well adapted to contain said AC adapter connector.

8. The charging system of claim 7 wherein said first member of said mounting stand comprises at least one arm, said at least one arm comprising a distal end and a push-tab at said distal end, and said second member comprises at least one aperture positioned and sized to receive said push-tab of said first member.

9. The charging system of claim 7 wherein said stand further comprises a recessed channel formed when said first and second members are interlocked.

10. The charging system of claim 7 wherein said well comprises a flat surface at one end, said flat surface adapted to contact a distal end of said AC adapter connector.

11. The charging system of claim 7 wherein said device has an AC receptacle and said well is positioned to correspond to the location of said AC receptacle.

12. The charging system of claim 7 wherein said recess is sized to fit a device selected from the group consisting of a wireless telephone, a electronic personal desk accessory, and a portable computer.

13. A method of charging a portable device comprising:
   providing a mounting stand comprising
      a first member; and
      a second member capable of removably interlocking with said first member, wherein said first and second member, when interlocked, forms a recess sized to fit a portable device and a substantially cylindrical well adapted to receive said AC adapter connector;
   providing a portable device;
   providing an AC adapter compatible with said device, said adapter comprising a plug, a connector, and a cord;
   connecting said AC adapter plug into a main power supply;
   connecting said AC adapter connector into said portable device, wherein said connector fits within said well of said mounting stand; and
   assembling said mounting stand to fit around said AC adapter connector by interlocking said first and second members.

14. A method of charging a portable device comprising:
   providing a mounting stand comprising
      a first member comprising at least one arm, said at least one arm comprising a distal end and a push-tab at said distal end; and
      a second member capable of removably interlocking with said first member, said second member comprising at least one aperture positioned and sized to receive said push-tab of said first member;
   providing an AC adapter comprising a plug, a connector, and a cord;

providing a portable device comprising an AC receptacle adapted to receive said AC adapter connector;

providing a main power supply;

connecting said AC adapter connector into said AC receptacle;

interlocking said first and second member of mounting stand by engaging said at least one push-tab into said at least one aperture to form a recess sized to fit said portable device and a substantially cylindrical well adapted to contain said AC adapter connector;

connecting said AC adapter plug to said main power supply.

15. The method according to claim 14 further comprising:

positioning said AC adapter cord within either first or second member prior to interlocking said first and second members.

16. The method according to claim 14 further comprising:

disengaging said push-tab from said aperture; and separating said first member from said second member.

17. The method according to claim 16 further comprising:

disconnecting said AC connector from said AC receptacle.

* * * * *